(12) United States Patent
Wei et al.

(10) Patent No.: US 11,207,719 B2
(45) Date of Patent: Dec. 28, 2021

(54) DEVICE AND METHOD FOR REMEDYING HEAVY-METAL-POLLUTED SOIL WITH MICROORGANISM

(71) Applicant: Northeast Agricultural University, Harbin (CN)

(72) Inventors: Zimin Wei, Harbin (CN); Xu Zhang, Harbin (CN); Beidou Xi, Beijing (CN); Xinyu Zhao, Beijing (CN); Yuanfeng Li, Harbin (CN); Liming Jia, Harbin (CN); Tiejun Wen, Harbin (CN); Mingxiao Li, Beijing (CN); Tianxue Yang, Beijing (CN)

(73) Assignee: Northeast Agricultural University, Harbin (CN)

( * ) Notice: Subject to any disclaimer, the term of this patent is extended or adjusted under 35 U.S.C. 154(b) by 790 days.

(21) Appl. No.: 15/895,499

(22) Filed: Feb. 13, 2018

(65) Prior Publication Data

US 2018/0229282 A1 Aug. 16, 2018

(30) Foreign Application Priority Data

Feb. 14, 2017 (CN) .......................... 201710079534.1

(51) Int. Cl.
*B09C 1/10* (2006.01)
(52) U.S. Cl.
CPC ............ *B09C 1/10* (2013.01); *B09C 2101/00* (2013.01)
(58) Field of Classification Search
CPC .............................. B09C 1/10; B09C 2101/00
See application file for complete search history.

(56) References Cited

U.S. PATENT DOCUMENTS 4,775,650 A * 10/1988 Portier ...................... C02F 3/06
502/62
4,810,385 A * 3/1989 Hater ...................... C02F 1/688
210/150

(Continued)

FOREIGN PATENT DOCUMENTS

CN 101168736 B 4/2008
CN 205165343 U 4/2016

(Continued)

OTHER PUBLICATIONS

Translation of CN205732272 from EPO accessed Sep. 29, 2020 (Year: 2020).*

*Primary Examiner* — William H. Beisner
*Assistant Examiner* — Danielle B Henkel
(74) *Attorney, Agent, or Firm* — Cesari & McKenna, LLP

(57) ABSTRACT

The present disclosure relates to a device and method for remedying a heavy-metal-polluted soil with a microorganism, and relates to a device for remedying a metal-polluted soil and a remediation method thereof. The present disclosure solves the problem that a remediation microorganism cannot be extracted from the soil. The device comprises a main plate and a plurality of microorganism-extracting chambers, wherein the main plate is connected to the microorganism-extracting chambers; the microorganism-extracting chamber are filled with a filler; a tail end of the microorganism-extracting chambers is spiky, and openings are separately provided on a side wall of the microorganism-extracting chambers. The method comprises: I, adding a nutrient medium to the soil, and then inoculating a remediation microorganism; and II, inserting the above device into the soil for 6~8 days, and then taking it out. The method can remedy heavy-metal-polluted soil in a short time with a high removal rate of the heavy metal.

11 Claims, 2 Drawing Sheets

(56) References Cited

U.S. PATENT DOCUMENTS

| | | | | |
|---|---|---|---|---|
| 4,925,564 | A * | 5/1990 | Francis | C02F 3/34 |
| | | | | 210/608 |
| 5,133,625 | A * | 7/1992 | Albergo | B09C 1/10 |
| | | | | 111/118 |
| 6,049,942 | A | 4/2000 | Johnson | |
| 6,733,207 | B2 * | 5/2004 | Liebert, Jr. | B09C 1/00 |
| | | | | 175/70 |
| 7,132,050 | B2 * | 11/2006 | Davis | C02F 3/348 |
| | | | | 210/615 |
| 7,681,509 | B2 * | 3/2010 | Bilak | A01C 15/02 |
| | | | | 111/7.2 |
| 8,114,659 | B2 * | 2/2012 | Rawson | B09C 1/10 |
| | | | | 435/262.5 |
| 2011/0207204 | A1 * | 8/2011 | Davis | B09C 1/10 |
| | | | | 435/262 |

FOREIGN PATENT DOCUMENTS

| | | |
|---|---|---|
| CN | 205165344 U | 4/2016 |
| CN | 205732272 U | 11/2016 |
| CN | 106238456 A | 12/2016 |
| CN | 205762935 U | 12/2016 |
| CN | 206483806 U | 9/2017 |

\* cited by examiner

DEVICE AND METHOD FOR REMEDYING HEAVY-METAL-POLLUTED SOIL WITH MICROORGANISM

CROSS-REFERENCE TO RELATED APPLICATIONS

This application claims priority of Chinese Invention Patent Application No. 201710079534.1, filed on Feb. 14, 2017.

TECHNICAL FIELD

The present disclosure relates to a device and method for remedying a heavy-metal-polluted soil.

BACKGROUND ART

Various production and living elements of human are derived from soil, in particular with respect to agricultural production associated with human's survival and development. However, with rapid development of modern economy, the environmental pollutant is increasing, and environmental pollution and ecological damages are becoming severe, leading to severe pollution to the soil on which the human relies. After a soil is polluted with heavy metals which cannot be degraded by native flora, it not only causes reduced production and deteriorated quality of the crops produced, but also poses threats to the health of human. Thus, related research has significant effect and value, and should attract more attention and consideration.

Currently, treatment methods of heavy-metal-polluted soil include soil replacement method, electrification method, in situ immobilization method, phytoremediation method, and microorganism remediation method.

The soil replacement method is to remove soil medium on surface and place new soil instead. This method has disadvantages of requiring lots of manpower and resources, large time consumption, and issues such as leakage, environmental pollution and the like. Also, the polluted soil becomes a new problem.

The electrification method is to place corresponding electrodes in soil which has been saturated with water, supply a direct current with a low intensity such that corresponding metal ions can be directionally moved under the effect of electromagnetic field and mainly concentrated around the electrodes, and then collect and treat the electrodes so as to clean heavy metals. However, this method has disadvantages of large electricity and water consumption, high costs, and unsatisfactory effect on high penetrable and low conductive sandy soil.

In situ immobilization technique refers to adjusting and changing physical and chemical properties of heavy metals in soil by adding an immobilizing agent to the soil, such that the heavy metals are subjected to a series of reactions such as precipitation, adsorption, ion exchange, humification, oxidation-reduction, and the like to reduce their bioavailability and mobility in soil environment, thereby reducing the toxicity of these heavy metals to animals and plants. However, there are several difficulties: first, each immobilizing agent is suitable for specific soil, and physical and chemical properties of soil, such as parent material, clay quality, pH and the like influence the remediation effect of the immobilizing agent directly. Changes in environmental conditions, in particular amount of precipitation and the like, will also influence the immobilization effect of the immobilizing agent on heavy metals. Second, the application of chemically synthesized organic-inorganic complex in soil remediation has an excessive high cost and a considerable environmental risk. Some immobilizing agents will also induce changes in physical and chemical properties of soil in the soil, resulting in adverse effect on vegetation. Third, although the adsorbent can immobilize heavy metals, the heavy metals still remain in soil environment, and the bioavailability of the heavy metals may vary as environmental condition changes.

Phytoremediation is to employ a hyper-accumulator plant in natural environment to remove heavy metal species from soil or to reduce the toxicity of heavy metals, thereby finally achieving treatment of polluted soil. Although this method will not cause secondary pollution, it requires a long enrichment and remediation time, and it is very difficult to find suitable hyper-accumulator or tolerable crop.

Microorganism remediation technique is to make use of effects of certain microorganisms on heavy metals, such as adsorption, precipitation, oxidation and reduction and the like, such that heavy metal pollutants are degraded, oxidized or reduced, or substituents thereon are removed, thereby reducing the toxicity of the heavy metals in the soil. This method has advantages of low cost, short remediation time, quick effectiveness, simple operation, low energy consumption, improved tolerance of strain by domestication, abundant strain resources, low requirements for soil environment and the like, and is an ideal method to solve soil heavy metal pollution in future. However, the current technique still cannot extract the remediation microorganism from the soil, and the heavy metal pollutant elements go back to soil when the microorganism dies, and heavy metals cannot be practically removed from the soil. Thus, the application of microorganism remediation method is limited.

SUMMARY

An object of the present disclosure is to provide a device for remedying a heavy-metal-polluted soil with a microorganism and a remediation method thereof, so as to solve the problem that a remediation microorganism cannot be extracted from the soil.

The device for remedying a heavy-metal-polluted soil with a microorganism of the present disclosure comprises a main plate and a plurality of microorganism-extracting chambers;

wherein a plurality of holes are uniformly distributed on the main plate; each hole is correspondingly connected to a head end of a microorganism-extracting chamber; the head end of the microorganism-extracting chamber is provided with a seal; the microorganism-extracting chamber is filled with a filler; a tail end of the microorganism-extracting chamber is spiky, and openings are separately provided on a side wall of the microorganism-extracting chamber.

A method for remedying a heavy-metal-polluted soil with a microorganism using the above device comprises:

I. adding a nutrient medium for a remediation microorganism to the heavy-metal-polluted soil, then inoculating the remediation microorganism, and culturing it for 6~8 days; and II. placing a filler soaked in a nutrient liquid into the microorganism-extracting chambers of the device of claim 1, inserting the device of claim 1 into the soil treated in step I and keep it there for 6~8 days, and then taking out the device of claim 1;

wherein after inoculating the remediation microorganism in step I, moisture of the soil is adjusted to and kept at 40%±5%.

The device of the present disclosure has the following advantage: the microorganism carrying heavy metals in the soil is extracted from the soil by using the nutrient liquid carried by the filler, thereby radically removing the heavy metal pollutants from the soil. The device has advantages of having a simple structure, easy operation, good extraction effect, saving energy and environment protection, and no secondary pollution to the soil.

In the method, the device insertion position is flexible and can be changed at any time when remedying a heavy-metal-polluted soil. The filler used in the method can be taken out, eluted and reused; and the filler eluent or used filler is centrally treated and disposed to avoid secondary pollution.

The method achieves separation and removal of heavy metals from soil by enriching heavy metals in the soil with a remediation microorganism, gathering the microorganism into the filler in the microorganism-extracting chamber, and finally taking the device (or the filler) out from the soil. Also, the heavy metals are highly concentrated in the filler or the eluent, and the post treatment effort and difficulty are substantially reduced.

The method of the present disclosure can remedy a heavy-metal-polluted soil rapidly in a short time with a high heavy metal removal rate.

The filler in the device of the present disclosure is not an immobilizing agent. The filler is used for adsorbing and gathering the remediation microorganism, and providing room for growing, reproducing and inhabiting of the remediation microorganism rather than adsorbing heavy metals.

DETAILED DESCRIPTION

Figure 1:
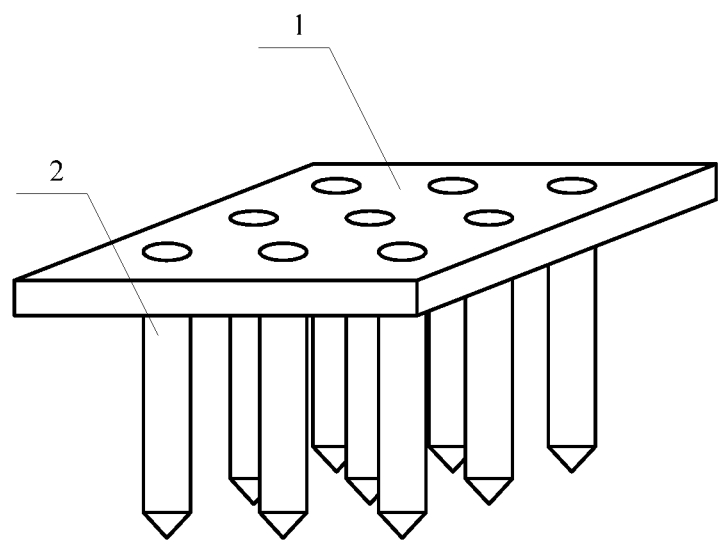
FIG. 1 is an overall structural schematic diagram of the device for remedying a heavy-metal-polluted soil with a microorganism.
Figure 2:
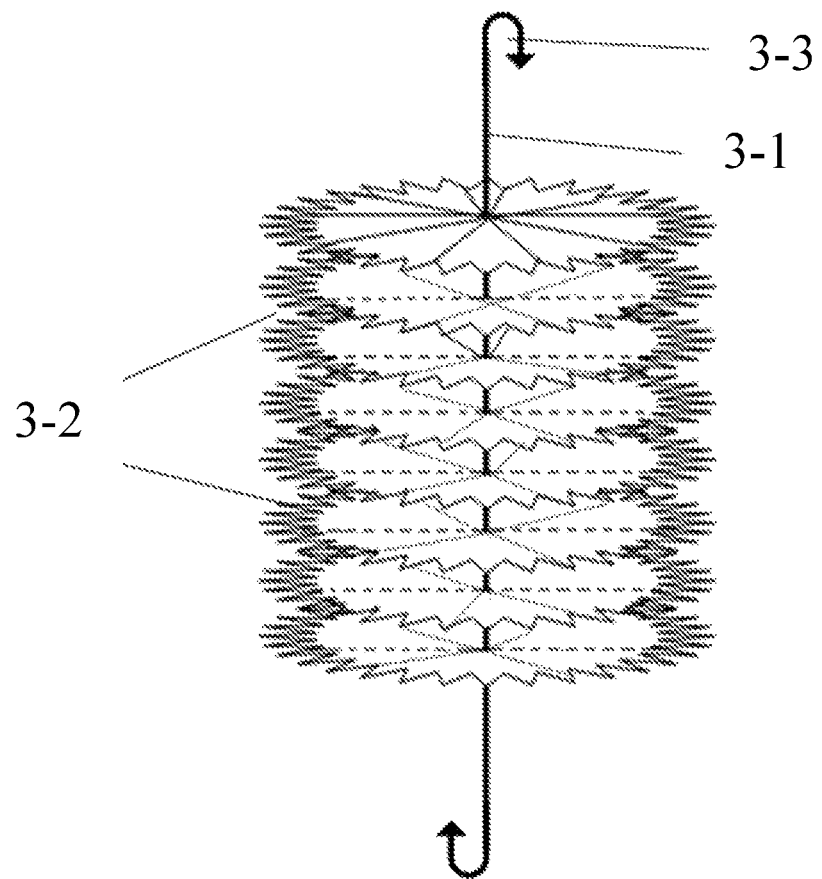
FIG. 2 is a structural schematic diagram of a suspended filler-loading unit.
Figure 3:
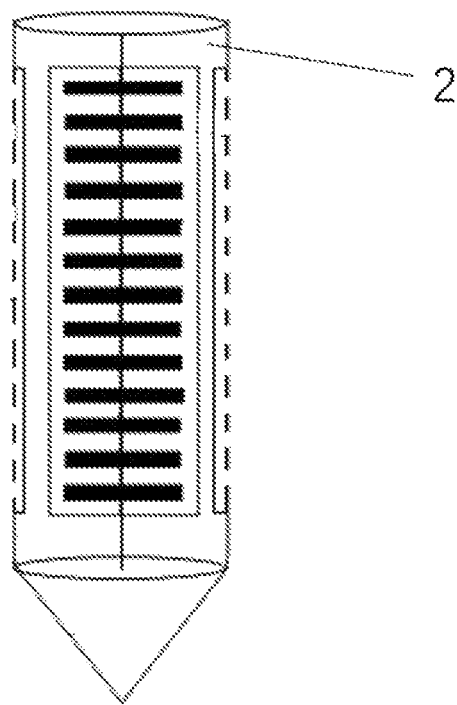
FIG. 3 is a structural schematic diagram of a microorganism-extracting chamber loaded with a filler.
Figure 4:
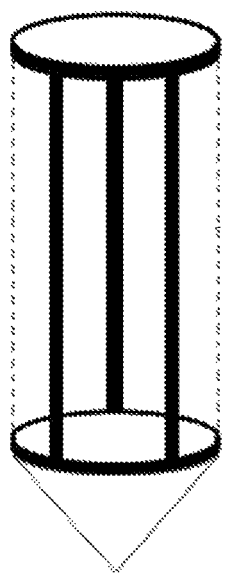
FIG. 4 is a structural schematic diagram of fence-type openings on the side wall of the microorganism-extracting chamber.
Figure 5:
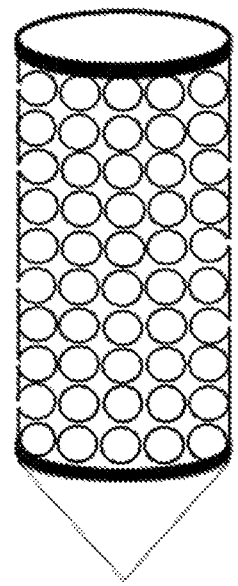
FIG. 5 is a structural schematic diagram of apertures distributed on the side wall of the microorganism-extracting chamber.

The technical solutions of the present disclosure are not limited to particular embodiments listed below, and also comprise any combination of various embodiments.

Embodiment I: this embodiment relates to a device for remedying a heavy-metal-polluted soil with a microorganism, wherein the device comprises a main plate 1 and a plurality of microorganism-extracting chambers 2.

A plurality of holes are uniformly distributed on the main plate 1; each hole is correspondingly connected to a head end of one microorganism-extracting chamber 2; the head end of each microorganism-extracting chamber 2 is provided with a seal; each microorganism-extracting chamber 2 is filled with a filler; a tail end of each microorganism-extracting chamber 2 is spiky, and openings are separately provided on a side wall of each microorganism-extracting chamber 2.

Embodiment II: this embodiment differs from Embodiment I in that: the device further comprises a suspended filler-loading unit including a central fibrous rope 3-1, a plurality of filler-separating sheets 3-2 and two hooks 3-3.

Centers of the plurality of filler-separating sheets 3-2 are suspended on the central fibrous rope 3-1, such that the plurality of filler-separating sheets 3-2 are uniformly distributed, the filler is filled between every two adjacent filler-separating sheets 3-2, and suspended on the central fibrous rope 3-1, two ends of the central fibrous rope 3-1 are connected to one of the hooks 3-3 respectively.

One suspended filler-loading unit is placed in the microorganism-extracting chamber 2; one hook 3-3 is positioned on an inner bottom end of the microorganism-extracting chamber 2, and the other hook 3-3 is connected to the seal of the microorganism-extracting chamber 2. The remaining are the same as that of Embodiment I.

Embodiment III: this embodiment differs from Embodiment I or II in that: the filler-separating sheets 3-2 have waved surfaces. The remaining are the same as that of Embodiment I or II.

Embodiment IV: this embodiment differs from any one of Embodiments I to III in that: the distribution concentration of the plurality of microorganism-extracting chambers 2 is in a range of 50~100 per $m^2$. The remaining are the same as that of any one of Embodiments I to III.

Embodiment V: this embodiment differs from any one of Embodiments I to IV in that: the openings on the side wall of the microorganism-extracting chamber 2 are fence-type openings or uniformly distributed apertures. The remaining are the same as that of any one of Embodiments I to IV.

Embodiment VI: this embodiment differs from any one of Embodiments I to V in that: the cross section of the microorganism-extracting chamber 2 has a shape of round, square, triangle or rhombus. The remaining are the same as that of any one of Embodiments I to V.

Corrosion resistant and degradable metal or hard plastic material with certain flexibility can be used as the material of the main plate 1 of the device. The sizes and lengths of the plurality of microorganism-extracting chambers 2 can be the same, and the plurality of microorganism-extracting chambers 2 may have certain strength so as to be inserted into soil, for example, the material is hard plastic or metal. The length thereof can be 20~50 cm, and when the microorganism-extracting chamber 2 has a shape of cylinder, the diameter thereof can be 3~5 cm. The filler may have high water absorption and large surface area, and can be uniformly and extendedly distributed in the effective area of the extracting-chamber. The filler can be polyamide, sponge or cotton and the like. Before use, the filler may be soaked in the nutrient liquid, such that the liquid containing nutrient sources beneficial for microorganism's growth can be adhered on the filler, maintain good activity and space variability. It can obtain greater and greater surface area during operation, and metabolize well. In practical use, the specification, distribution concentration, and depth of the main plate and microorganism-extracting chambers are selected depending on soil pollution condition. The severer the soil pollution is, the longer the microorganism-extracting chambers and deeper the insertion depth into the soil may be used.

The filler can be independently filled into the extracting-chamber, or can be filled into the extracting-chamber by immobilizing the filler on the suspended filler-loading unit and then placing the suspended filler-loading unit in the extracting-chamber. The central fibrous rope 3-1 of the suspended filler-loading unit may have characteristics such as corrosion resistance, high strength, and appropriate rigidity and flexibility. And it has hooks 3-3 provided on its ends, so that after enriching microorganism, the filler can be easily taken out from the tip-shape extracting-chamber. The suspended filler-loading unit may contain the filler in stereoscopically uniform arrangement so as to form suspended stereoscopic flexible combined filler, which is beneficial for increasing the holding amount of the nutrient liquid and the inhabiting space for the microorganism. The design of waved surfaces of the filler-separating sheets 3-2 is for increasing the surface area of the filled filler, so as to increase the holding amount of the nutrient liquid.

The openings distributed on the side wall of the microorganism-extracting chamber 2 are for ensuring sufficient contact between the filler in the extracting-chamber and the polluted soil. When the microorganism(s) in the soil is/are transferred onto the filler of the device and take(s) nutrient in, the microorganism(s) will be accumulated on the surface of the filler. The threaded tip of the microorganism-extracting chamber 2 is beneficial for enhancing the insertion strength to the soil.

Embodiment VII: this embodiment relates to a method for remedying a heavy-metal-polluted soil with a microorganism using the above device, comprising:

I. adding a nutrient medium for a remediation microorganism to the heavy-metal-polluted soil, then inoculating the remediation microorganism, and culturing it for 6~8 days; and II. placing a filler soaked in a nutrient liquid into the microorganism-extracting chambers of the device of claim 1, inserting the device of claim 1 into the soil treated in step I, keeping for 6~8 days, and then taking the device of claim 1 out;

wherein after inoculating the remediation microorganism in step I, soil moisture is adjusted to and kept at 40%±5%.

The remediation microorganism in step I of this embodiment is a single strain or combined strain, and suitable remediation microorganism(s) can be selected depending on the type of the heavy metal in the soil. The remediation microorganism is activated and expandingly cultured before inoculation, and the expanding culture medium can be selected depending on the type of the remediation microorganism(s). In the method of this embodiment, the medium is added to the heavy-metal-polluted soil, and then the remediation microorganism is inoculated and cultured 6~8 for days, such that the inoculated remediation microorganism is reproduced in the soil to be a dominant flora, suppressing the rapid growth of the native microorganisms in the soil and decreasing interference, and increasing the number of the remediation microorganism(s), improving the remediation effect, and facilitating the removal of the heavy metal.

Embodiment VIII: this embodiment differs from Embodiment VII in that: the nutrient medium in step I is maize flour, wheat bran or rice bran. The other steps and parameters are the same as those of Embodiment VII.

Embodiment IX: this embodiment differs from Embodiment VII or VIII in that: an additive amount of the nutrient medium in step I is 450~550 g nutrient medium per kg soil. The other steps and parameters are the same as those of Embodiment VII or VIII.

In this embodiment, the mass of soil can be calculated by multiplying the remediation depth (typically 20~30 cm) on the basis of the density and the area of the remedied soil.

Embodiment X: this embodiment differs from any one of Embodiments VII to IX in that: the nutrient liquid in step II is a liquid medium suitable for growth of the remediation microorganism. The other steps and parameters are the same as those of any one of Embodiments VII to IX.

In this embodiment, the liquid medium can be selected depending on the type of the remediation microorganism.

Embodiment XI: this embodiment differs from any one of Embodiments VII to X in that: step II is repeated, or the filler is changed, or the nutrient liquid is added to the filler. The other steps and parameters are the same as those of any one of Embodiments VII to X.

In this embodiment, the repeating times are determined depending on the degree of the heavy metal pollution and the remediation effect.

Embodiment XII: this embodiment differs from any one of Embodiments VII to XI in that: the filler has a large specific surface area and contains a water absorbing material. The other steps and parameters are the same as those of any one of Embodiments VII to XI.

The filler in this embodiment is polyamide, sponge or cotton.

Embodiment XIII: this embodiment differs from any one of Embodiments VII to XII in that: the remediation microorganism in step I is inoculated in a proportion of 50~500 ml bacteria solution per 1 kg soil. The other steps and parameters are the same as those of any one of Embodiments VII to XII.

In this embodiment, the volume of the inoculated bacteria solution can be adjusted depending on factors such as the concentration of the bacteria solution and the like. The mass of soil can be calculated by multiplying the remediation depth (typically 20~30 cm) on the basis of the density and the area of the remedied soil.

EXAMPLE 1

1 kg of Cd polluted soil was weighed, and the Cd content of the soil was measured.

The method of the present disclosure comprises:

I. 500 g of maize flour was added to 1 kg of heavy-metal-polluted soil, then 200 ml of remediation microorganism, *Kluyveromyces marxianus* YS-K1, was inoculated to the soil, and cultured for 7 days;

II. cotton was first soaked in a LB liquid medium, then placed in the microorganism-extracting chamber of the device, and thereafter the device was inserted into the soil treated in step I and kept for 7 days and then taken out; and III. step II was repeated once;

wherein after inoculating remediation microorganism in step I, the soil moisture was adjusted to and kept at 40%, and the concentration of *Kluyveromyces marxianus* YS-K1 was $10^6$~$10^7$ cfu/L.

*Kluyveromyces marxianus* YS-K1 is preserved in the laboratory of the present inventors for scientific research.

The device used in the present disclosure:

a device for remedying a heavy-metal-polluted soil with a microorganism, wherein the device comprises a main plate 1 and a plurality of microorganism-extracting chambers 2;

wherein a plurality of holes are uniformly distributed on the main plate 1; each hole is correspondingly connected to a head end of one microorganism-extracting chamber 2; the head end of each microorganism-extracting chamber 2 is provided with a seal; each microorganism-extracting chamber 2 is filled with a filler; a tail end of each microorganism-extracting chamber 2 is spiky, and openings are separately provided on a side wall of each microorganism-extracting chamber 2.

Control group:

the control group differs from the method of the present disclosure only in that no remediation microorganism is inoculated in step I.

The device was inserted into soil for 14 days, and the Cd element contents of the soil and the filler (cotton) were measured and converted to mass as shown in Table 1.

TABLE 1

|  | Original soil | Remedied soil | Soil of control group | Filler | Filler of control group |
|---|---|---|---|---|---|
| Cd element mass | 180.38 mg | 86.02 mg | 178.95 mg | 92.75 mg | 1.40 mg |

EXAMPLE 2

1 kg of copper polluted soil was selected, and the copper content of the soil was measured.

The method of the present disclosure comprises:

I. 500 g of wheat bran was added to 1 kg of heavy-metal-polluted soil, then 200 ml of remediation microorganisms, K.oxytoca YS-22 and Brevundimonas 764, were inoculated to the soil, and cultured for 7 days; and II. polyamide was first soaked in a LB liquid medium, then placed in the microorganism-extracting chamber, thereafter the device was inserted into the soil treated in step I and kept for 7 days, and then the LB liquid medium was added into the microorganism-extracting chamber of the device every 7 days;

wherein after inoculating the remediation microorganism in step I, soil moisture is adjusted to and kept at 40%, and the concentrations of K.oxytoca YS-22 and Brevundimonas 764 were $10^6$~$10^7$ cfu/L and $10^6$~$10^7$ cfu/L respectively.

Both microorganism strains for experiment are preserved in the laboratory of the present inventors for scientific research.

The device used in the present disclosure is the same as that in Example 1.

Control group:

The control group differs from the method of the present disclosure only in that no remediation microorganism is inoculated in step I.

The device was inserted into soil for 21 days, and the copper element contents of the soil and the filler (polyamide) were measured and converted to mass as shown in Table 2.

TABLE 2

| | Original soil | Remedied soil | Soil of control group | Filler | Filler of control group |
| --- | --- | --- | --- | --- | --- |
| Copper element mass | 59.45 mg | 32.38 mg | 56.85 mg | 26.01 mg | 1.45 mg |

EXAMPLE 3

1 kg of zinc polluted soil was weighed, and the zinc content of the soil was measured.

The method of the present disclosure comprises:

I. 500 g of rice bran was added to 1 kg of heavy-metal-polluted soil, then 200 ml of remediation microorganism, Pseudochrobactrum asaccharolyticum ZS2, was inoculated to the soil, and cultured for 7 days; and II. sponge was first soaked in a LB liquid medium, then placed in the microorganism-extracting chamber of the device, thereafter the device was inserted into the soil treated in step I and kept for 7 days, then the sponge in the microorganism-extracting chamber of the device was taken out and replaced with a new sponge soaked in the LB liquid medium every 7 days;

wherein after inoculating the remediation microorganism in step I, soil moisture is adjusted to and kept at 40%, and the concentration of Pseudochrobactrum asaccharolyticum ZS2 was $10^6$~$10^7$ cfu/L.

Pseudochrobactrum asaccharolyticum ZS2 is preserved in the laboratory of the present inventors for scientific research.

The device used in the present disclosure is the same as that in Example 1.

Control group:

The control group differs from the method of the present disclosure only in that no remediation microorganism is inoculated in step I.

The device was inserted into soil for 28 days, and the zinc element contents of the soil and the filler (sponge) were measured and converted to mass as shown in Table 3.

TABLE 3

| | Original soil | Remedied soil of the disclosure | Soil of control group | Filler of the disclosure | Filler of control group |
| --- | --- | --- | --- | --- | --- |
| Zinc element mass | 154.14 mg | 52.34 mg | 151.01 mg | 96.77 mg | 1.51 mg |

Examples 1, 2 and 3 demonstrate that the method of the present disclosure can remedy heavy-metal-polluted soil rapidly in a short time with a high heavy metal removal rate; and the heavy metal removal rate can be further improved by prolonging the remediation time. The method of the present disclosure achieves separation and removal of heavy metals from soil practically, and does not cause secondary pollution.

We claim:

1. A method for remedying a heavy-metal-polluted soil with a microorganism using a device comprising a main plate (1) and a plurality of microorganism-extracting chambers (2), each of the microorganism-extracting chambers (2) having a head end, a side wall, and a spiky tail end, the head end being provided with a seal, the head end being connected to one of a plurality of holes uniformly distributed on the main plate (1);

the side wall having a plurality of uniformly dispersed openings; and the microorganism-extracting chambers (2) being loaded with a filler, wherein the filler contains a water-absorbing material and has a large specific surface area for extracting and removing a microorganism carrying a heavy metal from the soil, the method comprising the steps of:

I) adding a nutrient medium for a remediation microorganism to the heavy-metal-polluted soil, then inoculating the remediation microorganism into the heavy-metal-polluted soil, and culturing the remediation microorganism for 6 to 8 days; and II) placing a filler soaked in a nutrient liquid into the microorganism-extracting chambers of the device, inserting the device into the soil, keeping the device therein for 6 to 8 days to allow the remediation microorganism that has absorbed heavy metals in the heavy-metal-polluted soil to enter the microorganism-extracting chambers of the device, and then taking out the device, thereby extracting and removing the remediation microorganism carrying a heavy metal from the soil;

wherein the soil is adjusted to keep a moisture content of 40%±5% after the step of inoculating the remediation microorganism of step I.

2. The method for remedying a heavy-metal-polluted soil with a microorganism according to claim 1, wherein the nutrient medium of step I is maize flour, wheat bran, or rice bran.

3. The method for remedying a heavy-metal-polluted soil with a microorganism according to claim 1, wherein an amount of 450 to 550 g nutrient medium per kg soil is added in step I.

4. The method for remedying a heavy-metal-polluted soil with a microorganism according to claim 1, wherein the nutrient liquid of step II is a liquid medium suitable for growth of the remediation microorganism.

5. The method for remedying a heavy-metal-polluted soil with a microorganism according to claim 1, wherein the method comprises repeating step II for one or more times, or changing the filler, or adding a nutrient liquid into the filler.

6. The method for remedying a heavy-metal-polluted soil with a microorganism according to claim 1, wherein the device further comprises a suspended filler-loading unit, wherein the unit comprises a central fibrous rope (3-1), a plurality of filler-separating sheets (3-2) and two hooks (3-3), wherein the plurality of filler-separating sheets (3-2) are suspended on the central fibrous rope (3-1), so that the plurality of filler-separating sheets (3-2) are uniformly distributed on the central fibrous rope (3-1), the filler being loaded between every two adjacent filler-separating sheets (3-2), each end of the central fibrous rope (3-1) being connected to one of the hooks (3-3);

each of the microorganism-extracting chambers (2) having a suspended filler-loading unit, one hook (3-3) being positioned at a bottom end of the microorganism-extracting chambers (2), another hook (3-3) being connected to the seal of the microorganism-extracting chamber (2).

7. The method for remedying a heavy-metal-polluted soil with a microorganism according to claim 6, wherein the filler-separating sheets (3-2) have waved surfaces.

8. The method for remedying a heavy-metal-polluted soil with a microorganism according to claim 1, wherein 50 to 100 microorganism-extracting chambers (2) per $m^2$ are arranged.

9. The method for remedying a heavy-metal-polluted soil with a microorganism according to claim 1, wherein the openings on the side wall of the microorganism-extracting chambers (2) are gratings or uniformly distributed apertures.

10. The method for remedying a heavy-metal-polluted soil with a microorganism according to claim 1, wherein the filler is selected from a polyimide, a sponge, and cotton.

11. The method for remedying a heavy-metal-polluted soil with a microorganism according to claim 1, wherein the filler is configured to be removed from the microorganism-extracting chambers (2), eluted, and reused.

* * * * *